(12) United States Patent
Sarkar et al.

(10) Patent No.: US 9,443,359 B2
(45) Date of Patent: Sep. 13, 2016

(54) VEHICLE ELECTRONIC CONTROL UNIT CALIBRATION

(71) Applicant: GM GLOBAL TECHNOLOGY OPERATIONS LLC, Detroit, MI (US)

(72) Inventors: Susanta P. Sarkar, Rochester Hills, MI (US); John J. Correia, Livonia, MI (US); Robert D. Hoover, Livonia, MI (US); Jamison C. Schroeder, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 14/013,193

(22) Filed: Aug. 29, 2013

(65) Prior Publication Data

US 2015/0066289 A1    Mar. 5, 2015

(51) Int. Cl.
*B60W 50/00* (2006.01)
*G05B 23/02* (2006.01)
(Continued)

(52) U.S. Cl.
CPC .............. *G07C 5/008* (2013.01); *B60W 50/00* (2013.01); *G06F 8/60* (2013.01); *G06F 8/65* (2013.01); *G06F 9/445* (2013.01); *B60W 2050/0077* (2013.01); *B60W 2050/0083* (2013.01)

(58) Field of Classification Search
CPC ........... F02D 2200/02; F02D 2400/11; F02D 41/24; F02D 41/2409; F02D 41/2422; F02D 41/2425; F02D 41/2432; F02D 41/2487; F02D 41/26; F02D 41/263; G05B 19/042; G05B 19/0426; G05B 2219/23327; G05B 2219/24034; G05B 2219/25092; G05B 2219/2637; G06F 21/572; G06F 21/64; G06F 8/665; G06F 8/60; G06F 8/65–8/68; G06F 9/445; G06F 9/44505; G07C 5/008; G07C 5/0858; Y02T 10/40; B60W 50/00; B60W 50/02; B60W 50/0205; B60W 50/04; B60W 50/045; B60W 2050/0075; B60W 2050/0077; B60W 2050/0083
USPC .................... 701/33.1, 29.1, 29.2, 29.6, 33.4
See application file for complete search history.

(56) References Cited

U.S. PATENT DOCUMENTS

| 5,426,585 | A  | * | 6/1995 | Stepper et al. | ........... | 702/85 |
| 6,466,861 | B2 | * | 10/2002 | Little | ........... | 701/114 |
| 6,571,191 | B1 | * | 5/2003 | York et al. | ........... | 702/107 |

(Continued)

FOREIGN PATENT DOCUMENTS

WO     WO 2014193347 A1 *  12/2014  .......... F02D 41/2432

*Primary Examiner* — Dale Moyer
(74) *Attorney, Agent, or Firm* — Cantor Colburn LLP

(57) ABSTRACT

Calibration for a vehicle electronic control unit (ECU) includes determining a trigger event configured to initiate a check for updates to calibration data files of the ECU, iterating through calibration part numbers present in the ECU, and accessing, from a memory device in communication with the vehicle, in response to the iterating, a chain of parts table in a linked list that maps calibration part numbers identified in the ECU unit to any subsequently-issued calibration part numbers. The subsequently-issued calibration part numbers reflect an index to the updates to the calibration data files. The calibration also includes searching the chain of parts table using the calibration part numbers identified in the ECU to determine a corresponding subsequently-issued calibration part number, selecting one of the updates to the calibration data files using the subsequently-issued calibration part number from the memory device, and updating the ECU with the selected update.

20 Claims, 2 Drawing Sheets

(51) Int. Cl.
*G07C 5/00* (2006.01)
*G06F 9/445* (2006.01)

(56) References Cited

U.S. PATENT DOCUMENTS

| | | | | |
|---|---|---|---|---|
| 6,823,247 B1* | 11/2004 | Issa | ................ | F02D 41/2487 |
| | | | | 701/32.7 |
| 7,069,452 B1* | 6/2006 | Hind | ................ | G06F 21/572 |
| | | | | 713/1 |
| 2002/0116093 A1* | 8/2002 | Aldrich et al. | ................ | 701/1 |
| 2006/0122746 A1* | 6/2006 | Gawlik | ................ | G06F 8/65 |
| | | | | 701/33.7 |
| 2006/0143600 A1* | 6/2006 | Cottrell | ................ | G06F 21/572 |
| | | | | 717/168 |
| 2006/0271254 A1* | 11/2006 | Shah | ................ | G01M 17/007 |
| | | | | 701/31.4 |
| 2007/0005873 A1* | 1/2007 | Baltes | ................ | 711/103 |
| 2007/0179691 A1* | 8/2007 | Grenn et al. | ................ | 701/29 |
| 2009/0187289 A1* | 7/2009 | Teramura et al. | ................ | 701/1 |
| 2010/0205450 A1* | 8/2010 | Sarnacke | ................ | G07C 5/0808 |
| | | | | 713/185 |
| 2011/0106374 A1* | 5/2011 | Margol | ................ | G06F 8/61 |
| | | | | 701/31.4 |
| 2013/0117739 A1* | 5/2013 | Mueller | ................ | G06F 8/60 |
| | | | | 717/169 |
| 2013/0261839 A1* | 10/2013 | Meyer | ................ | G07C 5/0808 |
| | | | | 701/1 |

* cited by examiner

VEHICLE ELECTRONIC CONTROL UNIT CALIBRATION

FIELD OF THE INVENTION

The subject invention relates to vehicle electronics and, more particularly, to vehicle electronic control unit calibration updates.

BACKGROUND

In order to update electronic control unit calibrations for a vehicle, a vehicle owner typically visits a dealership, and a service technician couples the vehicle to a remote server that provides information to the electronic control unit (ECU) for performing the update. Unlike simple software updates, which can be implemented by the vehicle owner at home using local media, calibrations can involve a significant number of variations. These variations may be due to customers' choice of features from the options available, variations among ECUs for different configurations, country of operation of the vehicle, varying operational languages possible in the vehicle, add-on features from after market sales, ability to suppressed features under development, etc.

On the other hand, there are manageable variants of application software for an ECU, as one application software configuration may execute in many vehicle configurations. Generally, application software and calibrations are identified in the configuration management system by their unique software part number—identical with their file name. Each bundle of calibrations meant for one configuration of an ECU variant has its associated matching application software. It is imperative to select the correct calibration, as software without a matching calibration meant for incorrect vehicle configuration will malfunction.

A remote server is better equipped to store and search from a large number of matching calibrations and application software. Even though it is possible to update application software for a current configuration using local media, a connection to the server and visit to the dealership is required to select the matching calibration.

Accordingly, it is desirable to provide a means for providing updates to calibrations for a vehicle without requiring a visit to the dealership or service provider.

SUMMARY

According to an exemplary embodiment, a method is provided. The method includes determining, by a computer processor in a vehicle, a trigger event configured to initiate a check for updates to calibration data files of an electronic control unit of the vehicle. The method also includes iterating through calibration part numbers present in the electronic control unit and accessing from a memory device in communication with the vehicle, in response to the iterating, a chain of parts table in a linked list that maps calibration part numbers identified in the electronic control unit to any subsequently-issued calibration part numbers. The subsequently-issued calibration part numbers reflect an index to the updates to the calibration data files. The method further includes searching the chain of parts table using the calibration part numbers identified in the electronic control unit to determine a corresponding subsequently-issued calibration part number, selecting one of the updates to the calibration data files using the subsequently-issued calibration part number from the memory device; and updating the electronic control unit with the selected update.

According to another exemplary embodiment, a system is provided. The system includes an electronic control unit disposed in a vehicle, a computer processor communicatively coupled to the electronic control unit, and logic executable by the computer processor. The logic is configured to implement a method, the method includes determining a trigger event configured to initiate a check for updates to calibration data files of the electronic control unit, iterating through calibration part numbers present in the electronic control unit, and accessing from a memory device in communication with the vehicle, in response to the iterating, a chain of parts table in a linked list that maps calibration part numbers identified in the electronic control unit to any subsequently-issued calibration part numbers. The subsequently-issued calibration part numbers reflect an index to the updates to the calibration data files. The method also includes searching the chain of parts table using the calibration part numbers identified in the electronic control unit to determine a corresponding subsequently-issued calibration part number, selecting one of the updates to the calibration data files using the subsequently-issued calibration part number from the memory device, and updating the electronic control unit with the selected update.

According to a further exemplary embodiment, a computer program product is provided. The computer program product includes a computer-readable storage medium having instructions embodied thereon, which when executed by a computer processor disposed in a vehicle, causes the computer processor to implement a method. The method includes determining a trigger event configured to initiate a check for updates to calibration data files of an electronic control unit of the vehicle, iterating through calibration part numbers present in the electronic control unit, and accessing from a memory device in communication with the vehicle, in response to the iterating, a chain of parts table in a linked list that maps calibration part numbers identified in the electronic control unit to any subsequently-issued calibration part numbers. The subsequently-issued calibration part numbers reflect an index to the updates to the calibration data files. The method further includes searching the chain of parts table using the calibration part numbers identified in the electronic control unit to determine a corresponding subsequently-issued calibration part number, selecting one of the updates to the calibration data files using the subsequently-issued calibration part number from the memory device, and updating the electronic control unit with the selected update.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses.

In accordance with an embodiment of the invention, vehicle updates to calibrations for an electronic control unit using resources provided in local storage are provided. Alternatively, updates to calibrations may be realized through off-board retrieval of calibration information, such as through wireless networks. The vehicle calibration processes enable calibration updates for calibration data files of electronic control units for a vehicle without having to require assistance from a dealership or service entity.

Figure 1:
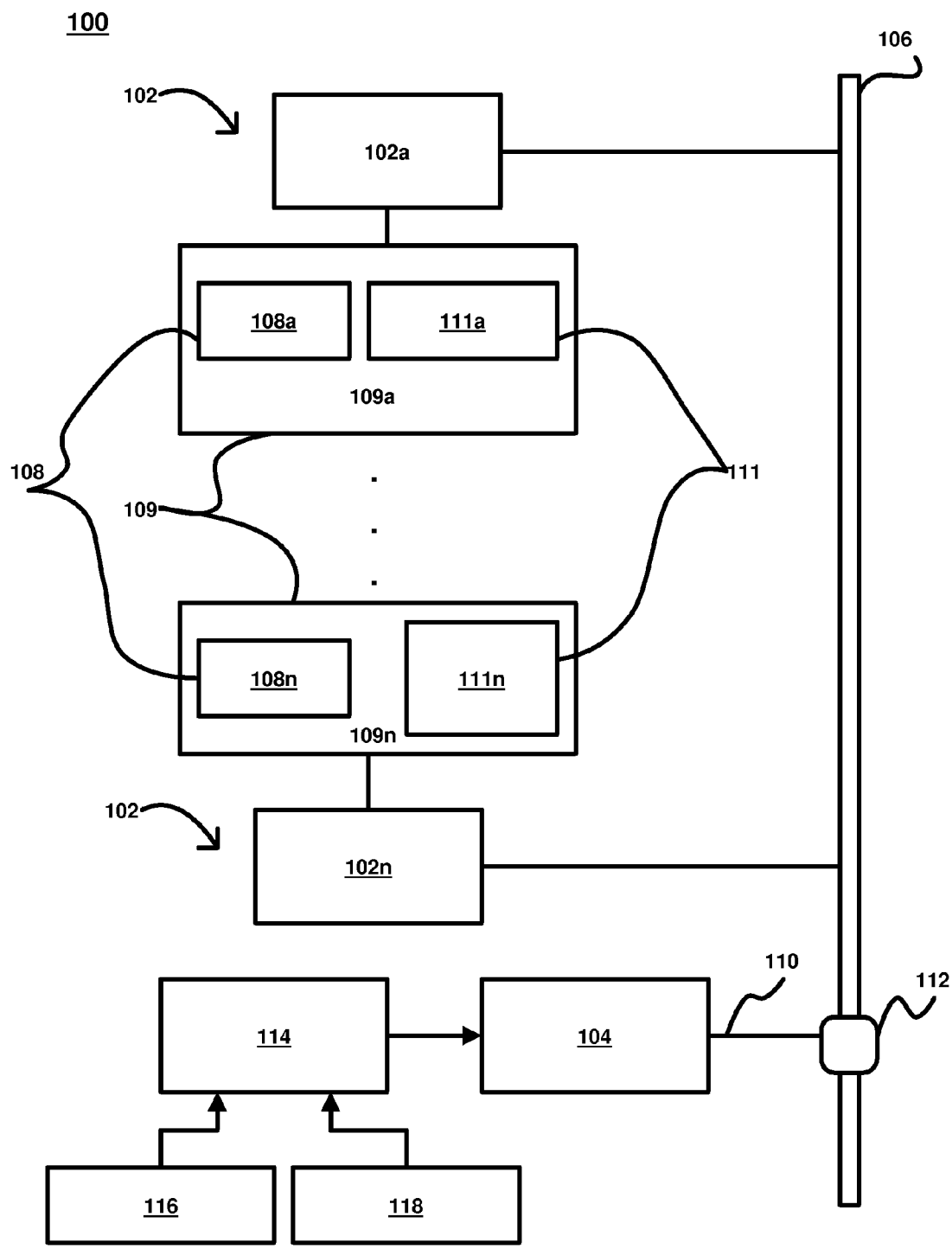
FIG. 1 is a system upon which calibration processes may be implemented in accordance with an embodiment of the invention.

Turning now to FIG. 1, a system 100 upon which electronic control unit calibration processes may be implemented will now be described in an exemplary embodiment. The system 100 includes electronic control units 102a-102n (collectively referred to as electronic control units 102) and a storage device 104 communicatively coupled to a serial data bus 106 (also referred to herein as "bus"). The coupling of the electronic control units 102 to the bus 106 may be facilitated via corresponding transceivers. In an alternative embodiment the bus 106 may be a parallel bus or other type of connection.

The electronic control units 102 may each include one or more microprocessors and memory. The electronic control units 102 utilize the microprocessors to process inputs from devices (e.g., inputs may be for Wi-Fi, Bluetooth™ (profiles for personal area networks, dial up networks, and serial ports), web requests, human-machine interface inputs, etc. (not shown)), and to convey this information to vehicle components, such as other electronic control units 102 or modules in the vehicle according to their respective functions, which then take appropriate action. Devices may communicate data through corresponding electronic control units 102 which in turn, send the data over the bus 106 via a transceiver. Other electronic control units 102 can read messages based on the message identifier contained in the data packets that make up the message.

The electronic control units 102a-102n each execute corresponding logic 108a-108n (collectively referred to as logic 108) for implementing the calibration processes described herein. In an alternative embodiment, a central controller (not shown) including hardware and logic circuitry may be used to implement the logic 108 and communicates with each of the electronic control units 102 to perform the calibration processes. The logic 108a-108n may be stored in corresponding memory devices 109a-109n. The electronic control units 102a-102n are communicatively coupled to the respective memory devices 109a-109n. Each electronic control unit 102a-102n is calibrated with a set of calibration bundles 111a-111n that, in turn, includes calibration part numbers for which the electronic control unit is calibrated. These calibration part numbers are stored in the memory devices 109a-109n, respectively. Calibration part numbers refer to identifiers for software files (also referred to as calibration data files) used to perform calibration updates.

The bus 106 may be implemented using any type of network configuration. For example, in one embodiment, the bus 106 may operate using standard protocols, such as controller-area network (CAN) protocols. By way of non-limiting examples, the bus 106 may be implemented as a single wire or may be two wires or other protocol, such as Ethernet or Media Oriented Systems Transport (MOST), that transmit data packets in the form of messages from one electronic control unit 102 to another and to other desired vehicle components, or may be implemented using any number of wires (e.g., a parallel bus). The bus 106 may be implemented in a multiplexed wiring fashion in which specified microprocessors consolidate inputs and outputs from multiple sources within a designated area of the vehicle (e.g., driver side door section including power window, power locks, driver side side-view mirror, etc.). In other non-limiting examples, the bus 106 may be implemented using coaxial cable or fiber optic cable, or may be implemented wirelessly using radio frequency signaling. It will be understood that the bus 106 may be implemented using any network topology known in the art, such as star, linear, ring, mesh, etc. The electronic control units 102 and bus 106 form part of an automotive network on a vehicle.

The microprocessors of the electronic control units 102 and other networked modules in the vehicle may include hardware elements (e.g., circuitry, logic cores, registers, etc.) for processing data configured to facilitate operation of the various components of the vehicle.

In an embodiment, the storage device 104 may be a portable USB drive that receives a storage medium 114 containing chain(s) of parts tables 116 of part numbers in a linked list which maps calibration part numbers identified in the electronic control units 102 to any subsequently-issued calibration part numbers. The subsequently-issued calibration part numbers reflect an index to the updates to calibration data files 118, which are stored in a database of the storage medium 114.

The storage device 104 may include a USB cable 110 that communicatively couples the storage device 104 to a USB port 112 of the bus 106. In an alternative embodiment, the storage device 104 may be integral to the vehicle, e.g., at the time of manufacture. In a further embodiment, the calibration information described herein may be supplied using off-board retrieval, e.g., through a wireless network, such as Wifi or Bluetooth connections between the vehicle and the information source.

Figure 2:
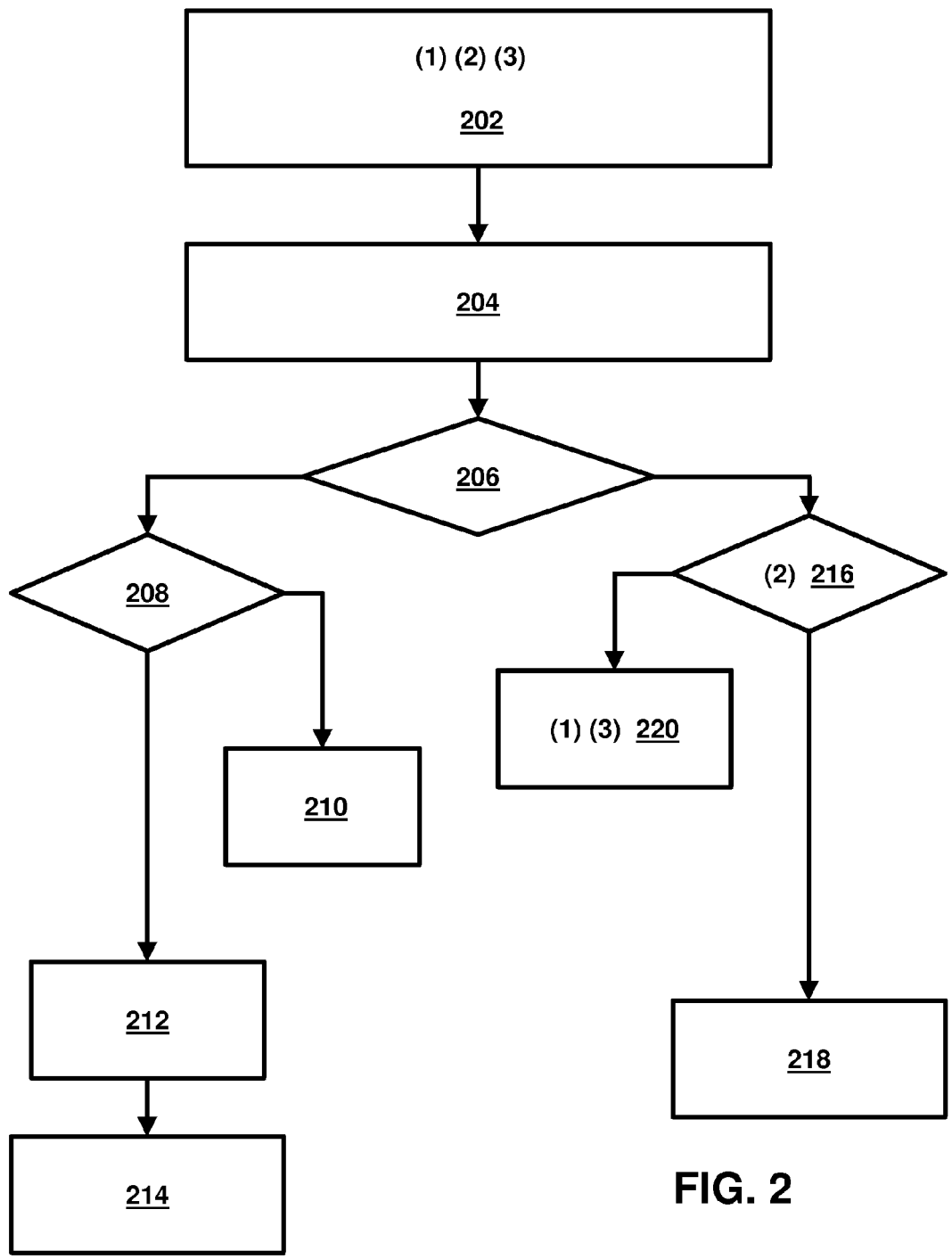
FIG. 2 is a flow diagram describing a process for implementing calibration processes on an automotive network in accordance with an embodiment.

Turning now to FIG. 2, a process for calibration updates in a vehicle network will now be described in an embodiment.

At step 202, a trigger event occurs indicating a calibration update may be required. The trigger event is configured to initiate a check for updates to calibration data files for the electronic control units. The trigger event may occur based on various actions. For example, a first trigger event (1) occurs when a user updates existing application software, a second trigger event (2) occurs when a user inserts a storage media (e.g., USB) with chain(s) of parts tables 116 and calibration data into a drive, and a third trigger (3) occurs when the electronic control unit, upon post-reset or self-test determines that application software and at least one calibration is not compatible.

At step 204, the ECU logic 108 iterates through calibration part numbers present in an electronic control unit 102, which are stored in a corresponding memory device 109. The logic 108 accesses the chain of parts table in the storage medium 114, in response to iterating through the calibration part numbers. As indicated above, the chain of parts table maps calibration part numbers to any subsequently-issued calibration part numbers. In one embodiment, this process may include selecting a row in the chain of parts table 116 present in the storage device 104 to determine if a newer calibration exists. Using the identified calibration part number as key, each row in the chain of parts table 116 is examined to determine if the head or any intermediate link matches the identified calibration part number.

If there is a match at step 206, the logic determines whether the identified calibration part number is the same as the tail of the link at step 208. If so, then the current calibration is the latest. In this instance, no calibration is required at step 210. If, however, there is a match (step 208), but it is not the tail (e.g., the match is an intermediate link or head), then the calibration part number in the tail reflects the latest calibration, and the ECU flags that calibration at step 212 for updating and saves this part number. A tail link may list more than one calibration part number, indicating replacement and addition.

At step 214, the logic 108 retrieves the new calibrations (e.g., calibration data files) for the new calibration part number from the calibration data files database 118 present in the storage device 104, and applies the new calibrations.

Returning now to step 206, if no match is found, but the trigger event is (2) in step 216, the calibration is up-to-date and it is determined that no calibration is needed at step 218. If at step 216, if the trigger is not (2) (i.e., the trigger is (1) or (3)), the electronic control unit will indicate a self-test error and send a message to the user suggesting the user take the vehicle to a dealer at step 220. The message may be delivered to the user using any communication means, e.g., through a communication interface in the vehicle.

The chain of parts table 116 and the calibration data files 118 may include a digital signature used to verify the authenticity (e.g., to verify a source) of the table 116 and data files 118.

Calibration part numbers for a particular electronic control unit 102 are stored in Table 1 (which corresponds to the calibration bundles 111 in FIG. 1). Table 2 (which corresponds to table 116 in FIG. 1) lists chain of calibration parts for all of the electronic control units in a vehicle. The chain of calibration parts table 116 is an array of linked lists, where the head of a list represents the original calibration part number and the tail of the list represents the latest calibration part number. The logic 108 is configured to verify the digital signature of the calibration data files found in Table 3 (which corresponds to the calibration data files 118 in FIG. 1). The digital signature is used to authenticate source of the calibration data, in the absence of a server connection. As shown below, e.g., calibration part number PN[1] is found in Table 2 and is mapped to new part calibration number PN12. In addition, PN[2] is found in Table 2 and is mapped to new calibration part number PN21. Finally, PN[y] is found in Table 2 and is mapped to new calibration part number PNm3. Similar to the Table 2 described above, the logic 108 is configured to verify the signature of the information stored in Table 3. Once the calibration information is identified for the new calibration part numbers, the electronic control unit is then updated with the calibration data files from the Table 3.

TABLE 1

| PN[1] |
|---|
| PN[2] |
| PN[y] |

TABLE 2

| Bundle |
|---|
| COP [PN1] --- PN12 |
| COP [PN2] --- PN21 |
| COP [PNm] --- PNm3 |

TABLE 3

| Calibration Archive Bundle |
|---|
| Calibration Archive 1 PNxy |
| Calibration Archive 2 PNpq |
| Calibration Archive n PNzz |

Technical effects of the embodiments provide electronic control unit calibration in a vehicle network. The vehicle calibration functions utilize resources provided in local storage so that a vehicle owner need not visit a dealership in order to update calibration data files for the vehicle.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method, comprising:
determining, by a computer processor in a vehicle, a trigger event configured to initiate a check for updates to calibration data files of an electronic control unit of the vehicle, wherein the trigger event occurs in response to one of the user updating a software application associated with the electronic control unit, the user inserting a storage device into a storage drive of the vehicle, and upon a post-reset or self-test the determination an application is not compatible with at least one calibration;
iterating through and identifying calibration part numbers present in the electronic control unit;
accessing, from the storage device in communication with the vehicle, in response to the iterating, a chain of parts table in a linked list that maps calibration part numbers identified in the electronic control unit to any subsequently-issued calibration part numbers, the subsequently-issued calibration part numbers reflecting an index to the updates to the calibration data files;

searching the chain of parts table using the calibration part numbers identified in the electronic control unit to determine a corresponding subsequently-issued calibration part number;

selecting one of the updates to the calibration data files using the subsequently-issued calibration part number from the memory device; and updating the electronic control unit with the one of the updates to the calibration data files.

2. The method of claim 1, further comprising:

verifying a digital signature of the chain of parts table and the calibration data file prior to the accessing.

3. The method of claim 1, wherein the linked list, containing an original calibration part number followed by all of the subsequently-issued calibration part numbers that each represent a revision and update to the original calibration part number, includes:

a first calibration part number representing either the original part number or one of the subsequently-issued calibration part numbers in the linked list; and a second calibration part number that is linked in consecutive order to the first calibration part number.

4. The method of claim 3, wherein the check for the updates is determined in response to one of the calibration part numbers identified for the electronic control unit matches the first calibration part number.

5. The method of claim 3, wherein no calibration update is performed when none of the calibration part numbers identified for the electronic control unit has the corresponding second calibration part number.

6. The method of claim 3 further comprising sending a message to a user to contact a vehicle dealer when the trigger event occurs in response to the user updating a software application associated with the electronic control unit, or upon a post-reset or self-test the determination an application is not compatible with at least one calibration, and in response to none of the calibration part numbers identified for the electronic control unit has the corresponding second calibration part number.

7. The method of claim 6 further comprising performing no calibration update in response to none of the calibration part numbers identified for the electronic control unit having the corresponding second calibration part number, and in response to the trigger even occurring in response to the user inserting a storage device into a storage drive of the vehicle.

8. The method of claim 1, wherein the computer processor resides in the electronic control unit.

9. A system, comprising:

an electronic control unit disposed in a vehicle;

a computer processor communicatively coupled to the electronic control unit; and logic executable by the computer processor, the logic configured to implement a method, the method comprising:

determining a trigger event configured to initiate a check for updates to calibration data files of the electronic control unit, wherein the trigger event occurs in response to one of the user updating a software application associated with the electronic control unit, the user inserting a storage device into a storage drive of the vehicle, and upon a post-reset or self-test the determination an application is not compatible with at least one calibration;

iterating through and identifying calibration part numbers present in the electronic control unit;

accessing, from the storage device in communication with the vehicle, in response to the iterating, a chain of parts table in a linked list that maps calibration part numbers identified in the electronic control unit to any subsequently-issued calibration part numbers, the subsequently-issued calibration part numbers reflecting an index to the updates to the calibration data files;

searching the chain of parts table using the calibration part numbers identified in the electronic control unit to determine a corresponding subsequently-issued calibration part number;

selecting one of the updates to the calibration data files using the subsequently-issued calibration part number from the memory device; and updating the electronic control unit with the one of the updates to the calibration data files.

10. The system of claim 9, wherein the logic is further configured to implement:

verifying a digital signature of the chain of parts table and the calibration data file prior to the accessing.

11. The system of claim 9, wherein the linked list, containing an original calibration part number followed by all of the subsequently-issued calibration part numbers that each represent a revision and update to the original calibration part number, includes:

a first calibration part number representing either the original part number or one of the subsequently issued calibration part numbers in the linked list; and a second calibration part number that is linked in consecutive order to the first calibration part number.

12. The system of claim 11, wherein the check for the updates is determined in response to one of the calibration part numbers identified for the electronic control unit matches the first calibration part number.

13. The system of claim 11, wherein no calibration update is performed when none of the calibration part numbers identified for the electronic control unit has the corresponding second calibration part number.

14. The system of claim 11 wherein the method further comprises sending a message to a user to contact a vehicle dealer when the trigger event occurs in response to the user updating a software application associated with the electronic control unit, or upon a post-reset or self-test the determination an application is not compatible with at least one calibration, and in response to none of the calibration part numbers identified for the electronic control unit has the corresponding second calibration part number.

15. The system of claim 14 wherein the method further comprises performing no calibration update in response to none of the calibration part numbers identified for the electronic control unit having the corresponding second calibration part number, and in response to the trigger even occurring in response to the user inserting a storage device into a storage drive of the vehicle.

16. The system of claim 9, wherein the computer processor resides in the electronic control unit.

17. A computer program product comprising a computer-readable storage medium having program instructions embodied thereon, wherein the computer-readable storage medium is not a transitory signal, the program instructions when executed by a computer processor disposed in a vehicle, causes the computer processor to implement a method, the method comprising:

determining a trigger event configured to initiate a check for updates to calibration data files of an electronic control unit of the vehicle, wherein the trigger event occurs in response to one of the user updating a software application associated with the electronic control unit, the user inserting a storage device into a storage drive of the vehicle, and upon a post-reset or self-test the determination an application is not compatible with at least one calibration;

iterating through and identifying calibration part numbers present in the electronic control unit;

accessing, from the storage device in communication with the vehicle, in response to the iterating, a chain of parts table in a linked list that maps calibration part numbers identified in the electronic control unit to any subsequently-issued calibration part numbers, the subsequently-issued calibration part numbers reflecting an index to the updates to the calibration data files;

searching the chain of parts table using the calibration part numbers identified in the electronic control unit to determine a corresponding subsequently-issued calibration part number;

selecting one of the updates to the calibration data files using the subsequently-issued calibration part number from the memory device; and updating the electronic control unit with the one of the updates to the calibration data files.

18. The computer program product of claim 17, wherein the linked list, containing an original calibration part number followed by all of the subsequently-issued calibration part numbers that each represent a revision and update to the original calibration part number, includes:
- a first calibration part number representing either the original part number or one of the subsequently-issued calibration part numbers in the linked list; and
- a second calibration part number that is linked in consecutive order to the first calibration part number.

19. The computer program product of claim 18 wherein the method further comprises sending a message to a user to contact a vehicle dealer when the trigger event occurs in response to the user updating a software application associated with the electronic control unit, or upon a post-reset or self-test the determination an application is not compatible with at least one calibration, and in response to none of the calibration part numbers identified for the electronic control unit has the corresponding second calibration part number.

20. The computer program product of claim 19 wherein the method further comprises performing no calibration update in response to none of the calibration part numbers identified for the electronic control unit having the corresponding second calibration part number, and in response to the trigger even occurring in response to the user inserting a storage device into a storage drive of the vehicle.

* * * * *